(12) United States Patent
Soinio et al.

(10) Patent No.: US 7,936,945 B2
(45) Date of Patent: May 3, 2011

(54) SYSTEM, METHOD, DEVICE, AND COMPUTER PROGRAM PRODUCT FOR PROVIDING IMAGE CORRECTION

(75) Inventors: Asmo Soinio, Turku (FI); Henrik Hyyppä, Turku (FI); Larri Vermola, Turku (FI); Jonni Friman, Hämeenlinna (FI)

(73) Assignee: Nokia Corporation, Espoo (FI)

( * ) Notice: Subject to any disclaimer, the term of this patent is extended or adjusted under 35 U.S.C. 154(b) by 1148 days.

(21) Appl. No.: 11/612,347

(22) Filed: Dec. 18, 2006

(65) Prior Publication Data

US 2008/0144964 A1  Jun. 19, 2008

(51) Int. Cl.
G06K 9/36 (2006.01)
G06K 9/00 (2006.01)

(52) U.S. Cl. .................... 382/275; 382/100

(58) Field of Classification Search .......... 382/275, 382/236, 293–296, 100, 107, 289
See application file for complete search history.

(56) References Cited

U.S. PATENT DOCUMENTS 5,067,014 A * 11/1991 Bergen et al. ............... 382/107
6,277,030 B1    8/2001 Baynton et al.
6,786,730 B2 *  9/2004 Bleckley et al. ............. 434/247

OTHER PUBLICATIONS

*Golf Swing Analysis Software*; GASP Systems; 1998-2006; 1 page; available at <http://www.gaspsystems.com> (visited Dec. 18, 2006).
*Golf Swing Analysis System and Putting Analysis System*; 2 pages; available at <http://www.thegolfsystem.com> (visited Dec. 18, 2006).
Marci Meingast, Christopher Geyer, Shankar Sastry; *Geometric Models of Rolling-Shutter Cameras*; Mar. 2005; 9 pages; V 1; EECS Department, University of California, Berkeley; arXiv:cs.CV0503076.
Omar Ait-Aider, Nicholas Andreff, Jean Marc Lavest, Philippe Martinet; *Exploiting Rolling Shutter Distortions for Simultaneous Object Pose and Velocity Computation Using a Single View*; Proceedings of the Fourth IEEE International Conference on Computer Vision Systems; 2006; 7 pages; IEEE Computer Society.
Chi-Kai, Yu-Chun Peng, Homer Chen; *Rolling Shutter Distortion Correction*; Proceedings of SPIE; Visual Communications and Image Processing;2005; 8 pages; vol. 5960; Bellingham, Washington.

* cited by examiner

*Primary Examiner* — Yon Couso
(74) *Attorney, Agent, or Firm* — Alston & Bird LLP

(57) ABSTRACT

A system, method, device, and computer program product are provided for correcting motion skew in a frame of video or in other images captured using a rolling shutter image sensor. A method for removing motion skew may create a mathematical model of the motion skew, compute the motion skew using the mathematical model of the motion skew, remove the distorted image of the object from view in the image using the computed motion skew, and render a corrected image of the object in the image using the computed motion skew.

28 Claims, 9 Drawing Sheets

SYSTEM, METHOD, DEVICE, AND COMPUTER PROGRAM PRODUCT FOR PROVIDING IMAGE CORRECTION

FIELD OF THE INVENTION

Embodiments of the invention relate generally to correcting image distortions caused when a rolling shutter camera is used to capture an image of a moving object. More particularly, embodiments of the present invention relate to systems, methods, devices, and computer program products for correcting an image of an object in a video frame using a mathematical model of the distortion of the object in the video frame.

BACKGROUND OF THE INVENTION

Modern mobile terminals, such as mobile phones, are often equipped with digital cameras. Such digital cameras are often used to record still images and/or video images. Many mobile terminal cameras, as well as other imaging devices, use image sensors that record images using what is known as a "rolling shutter" technique, as opposed to "global shutter" technique. For example, a commonly used image sensor that uses a rolling shutter is a complementary metal oxide semiconductor (CMOS) image sensor.

With a global shutter image sensor, all of the pixels of the image are captured at the same time. However, with a rolling shutter image sensor, the image sensor sequentially charges rows of detectors, waits a short exposure time, and then reads the exposure information row by row. In other words, rolling shutter sensors result in images where the actual time of exposure is not uniform for the whole image area. Therefore, rolling shutter image sensors may result in images with some amount of distortion if some object in the image is moving relative to the image sensor, including situations where the object is moving and situations where the sensor is moving. Although rolling shutter sensors sequentially expose all of the rows relatively quickly, for very fast motion, such as the swinging of a golf club, the object may move a human perceptible distance between the time when one row of pixels is exposed and the time when another later row of pixels is exposed. In general, the faster an object is moving relative to the camera the more distortion there will be in the image of that object. This can be true for both still images and for individual frames in a video.

For example, FIGS. 1a and 1b each illustrate a frame from a video of a golfer swinging a golf club. FIG. 1a illustrates how the frame 100 may typically look when recorded using a global shutter image sensor. Since the global shutter image sensor exposes the whole image at the same time, the image of the golf club 110 is not distorted by the image sensor. In contrast, FIG. 1b illustrates how frame 150 may typically look if the video were recorded using a rolling shutter image sensor where the rolling shutter image sensor exposes rows of pixels sequentially from top to bottom. Since the actual exposure time at the top of the image is earlier than the exposure time at the bottom of the image, the fast moving golf club 160 appears noticeably distorted. More specifically, since the golf club 160 is moving very quickly relative to the camera from the left side 151 of the image 150 towards the right side 152 of the image 150, the golf club 160 moves slightly more to the right each time the image sensor exposes a new row of pixels. Thus, the golf club shaft 161 has a curved appearance in the frame 150, curving towards the right side 151 of the image 150 as golf club shaft 161 gets closer to the bottom 153 of the image 150. Although the golfer's body 165 is also moving relative to the image sensor, in this example, the speed of the rolling shutter action of the sensor is high enough relative to the speed of the motion of the golfer's body 165 and hands 166 such that the golfer 165 does not appear noticeably distorted. However, the speed of the golf club 160 is much faster than the speed of the golfer's body 165 and is high enough so that that the image of the club 160 is noticeably distorted. This effect is referred to as motion skew.

Despite the distortion that can result from a rolling shutter sensor, many rolling shutter sensors, such as CMOS sensors, have advantages over other types of sensors. For example CMOS sensors are usually more economical than most other types of comparable image sensors. Furthermore, many rolling shutter sensors can capture and read out the image data faster than a global shutter image sensor since the rolling shutter sensor typically reads out the data captured by one row of pixels while another row of pixels is being exposed, while a global shutter sensor exposes all of the rows of pixels and then must read out all of the captured data at the same time. As a result, video cameras using a rolling shutter image sensor may be able to capture more frames per second than a camera using a global image sensor. Thus, a solution is needed to fix or at least reduce the image distortion that can be caused when a rolling shutter image sensor is used to capture an image of an object moving relative to the image sensor.

BRIEF SUMMARY OF THE INVENTION

In one embodiment of the present invention, a method is provided for removing motion skew from an image that otherwise causes a distorted image of the object. The method may include: computing a representation of the distorted object image using a mathematical model of the motion skew, the representation of the distorted object image providing an approximate shape and location within the image of the distorted image of the object; removing the distorted image of the object from view in the image using the computed representation of the distorted object image; and rendering a corrected image of the object in the image using the computed representation of the distorted object image.

The method may further include creating the mathematical model of the motion skew. Creating the mathematical model of the motion skew may involve creating a mathematical model of the approximate motion between the object and the rolling shutter image sensor at the time that the image was captured; and using the mathematical model of the approximate motion of the object to create the mathematical model of the motion skew. The mathematical model of the motion skew may be a function of velocity of the object relative to the rolling shutter image sensor during exposure of the object, and rate of a rolling shutter action of the rolling shutter image sensor.

The method may further include detecting a distorted image of the object in the image. Detecting the distorted image of the object may involve analyzing the detected distorted image and gathering information from the distorted image. If so, then the computing of the representation of the distorted object image using the mathematical model may include using the gathered information as values for parameters in the mathematical model.

In one embodiment of the method, where the image includes a frame in a video, detecting the distorted image of the object may involve: detecting at least a portion of the distorted object in the frame in the video; detecting at least a portion of the distorted object in a different frame in the video; and computing the velocity of the moving object by comparing the detected object portions of the two frames. If so, then the computing of the representation of the distorted object image using the mathematical model may include using the computed velocity of the moving object as a value of a parameter in the mathematical model.

In one embodiment of the method, the removing of the distorted image of the object includes generating a mask for removing from view the distorted image of the object. Generating a mask for removing from view the distorted image of the object may involve using the computed representation of the distorted object image to create a mask for removing the distorted image of the object from view in the image.

Where the image comprises a frame in a video, the method may include replacing pixels in an area of the image where distorted image of the object has been removed from view with pixels gathered from a corresponding area of a different frame in the video. Rendering a corrected image of the object may include using the mathematical model of the motion skew to translate pixels of the distorted image of the object to locations in the image that form the corrected image of the object. Rendering a corrected image of the object may further include rendering the corrected image of the object to form an image of the object as the object generally appeared at a time proximate when the object was first exposed by a rolling shutter image sensor when capturing the image. In one embodiment, the image of the object is captured by a rolling shutter image sensor embodied in a device configured to capture video, and the image is a frame in a video.

In one embodiment, the object includes a generally straight elongate object having a first end and a second end, and is generally moving about the first end relative to a rolling shutter image sensor during exposure of the object by the image sensor. The object may generally move from a first angle ($\alpha$) to a second angle ($\beta$) during the exposure of the object by the image sensor. In such an embodiment, the creating of the mathematical model may include: providing x- and y-coordinate axes to the image so that the y-axis is perpendicular to rows of pixels sequentially exposed by the rolling shutter image sensor; standardizing the x- and y-coordinates so that a Euclidean distance between the first end and the second end of the object has a value of 1; selecting a point in the image proximate the first end of the object; and assuming that this point is the origin of the coordinate axes. The mathematical model of the motion skew may be configured to be used to generate a representation of the distorted elongate object image. The x-coordinate of the representation ($x_{image}$) may be represented as a mathematical function of the y-coordinate (y) as y advances from 0 to $y_{max}$, where $y_{max}$ is the y-coordinate of the second end of the object when the object is at angle $\beta$. Such a mathematical function may be $x_{image} = y \tan(\alpha(y_{max}-y)/y_{max}+\beta y/y_{max})$, where the angle $\alpha$ can be determined by the function $\alpha=\beta-(\theta_{club} t_{shutter} height_{club\beta})$, where $\theta_{club}$ is the angular velocity of the object during the exposure of the object, where $t_{shutter}$ is the time taken by the rolling shutter image sensor to expose each row of pixels before exposing a next row of pixels, where $height_{club\beta}$ is the height of the object in pixels in the y-direction when the object is at angle $\beta$, and where the coordinates are divided by the length. In one embodiment, the object comprises a golf club.

In one embodiment of the present invention, a computer program product is provided for removing motion skew from an image that otherwise causes a distorted image of the object. The computer program product includes at least one computer-readable storage medium having computer-readable program code portions stored therein, The computer-readable program code portions may include: a first executable portion for computing a representation of the distorted object image based on a mathematical model of the motion skew, the representation of the distorted object image providing an approximate shape and location within the image of the distorted image of the object; a second executable portion for removing the distorted image of the object from view in the image using the computed representation of the distorted object image; and a third executable portion for rendering a corrected image of the object in the image using the computed representation of the distorted object image. The computer-readable program code portions may further include a fourth executable portion for generating a mathematical model of the motion skew. The mathematical model of the motion skew may be a function of velocity of the object relative to the rolling shutter image sensor during exposure of the object, and rate of a rolling shutter action of the rolling shutter image sensor.

The computer-readable program code portions may include an executable portion for detecting the distorted image of the object in the image. Such an executable portion may include an executable portion for analyzing the detected distorted image and gathering information from the distorted image. If so, then the first executable portion may include a sixth executable portion for computing the representation of the distorted object image from the mathematical model of the motion skew using the gathered information. If the image is a frame in a video, the computer-readable program code portions may include a an executable portion for detecting at least a portion of the distorted object in the frame in the video; detecting at least a portion of the distorted object in a different frame in the video; and computing the velocity of the moving object by comparing the detected object portions of the two frames. If so, then the first executable portion may include an executable portion for computing the representation of the distorted object image from the mathematical model of the motion skew using the computed velocity of the moving object.

The second executable portion of the computer program product may include an executable portion for creating a mask to remove the distorted image of the object from view in the image based at least partially upon the computed representation of the distorted object image. If the image is a frame in a video having a plurality of frames, and the second executable portion may further include an executable portion for replacing pixels in an area of the image comprising the removed distorted image of the object with pixels gathered from a corresponding area of a different frame in the video. The third executable portion of the computer-program product may include an executable portion for translating pixels of the distorted image of the object to locations in the image that form the corrected image of the object using the representation of the distorted object image computed by the first executable portion.

In one embodiment of the present invention, a device is provided that is configured to correct motion skew in an image that includes a skewed object image. The device may include a processor configured to: compute a representation of the skewed object image based on a mathematical model of the motion skew, the representation of the skewed object image providing an approximate shape and location within the image of the skewed object image; remove the skewed object image from view in the image using the computed representation of the skewed object image; and render a corrected object image in the image using the representation of the skewed object image. The device may further include a rolling shutter image sensor for capturing the image and a display for displaying the captured image. The processor of the device may be further configured to geometrically translate pixels that comprise the skewed object image based on the computed representation of the skewed object image.

The mathematical model may include a mathematical function of the representation of the skewed object image as a function of the object's velocity during the exposure of the object and the rolling shutter image sensor's rate of rolling shutter action. If the image comprises one frame in a video having a plurality of frames, then the processor may be further configured to calculate at least an approximation of the velocity of the object by comparing the current frame with a different frame in the video. The processor may also be configured to copy pixels from a different frame of the video in order to replace the pixels in the current frame of the distorted object image.

In one embodiment of the present invention, a method is provided for removing distortion from a video of a swinging golf club, wherein the distortion comprises a distorted golf club image. The method may include: generating a mathematical model of the distortion in the golf club; removing the distorted golf club image from a frame of the video; and rendering a corrected golf club image in the frame based on the mathematical model of the distortion. The rendering of a corrected golf club may involve geometrically translating the pixels that comprise the distorted golf club image based on the mathematical model of the distortion in the golf club. The generating a mathematical model may involve generating a mathematical function of a representation of the distorted golf club image as a function of the golf club's angular velocity while rotating about a point during the exposure of the golf club and the rolling shutter image sensor's rate of rolling shutter action.

The mathematical function of the distorted golf club image may include: $x_{image} = y \tan(\alpha(y_{max}-y)/y_{max} + \beta y/y_{max})$, where the x- and y-coordinates are based on x- and y-axes, where the y-axis is perpendicular to rows of pixels sequentially exposed by the rolling shutter image sensor, where the x-axis is perpendicular to the y-axis, where the coordinates are standardized so that the Euclidean distance between a first end and a second end of the golf club has a value of 1, where the origin of the axis is located at the first end of the golf club which comprises the point about which the golf club rotates, where $x_{image}$ is the x-coordinate of the representation of the skewed golf club image, where $y_{max}$ is the y-coordinate of the second end of the golf club when the object is at angle $\beta$, where the angle $\alpha$ can be determined by the function $\alpha = \beta - (\theta_{club} t_{shutter} height_{club\beta})$, where $\theta_{club}$ is the angular velocity of the golf club during the exposure of the golf club, where $t_{shutter}$ is the time taken by the rolling shutter image sensor to expose each row of pixels before exposing a next row of pixels, and where the $height_{club\beta}$ is the height of the golf club image in pixels in the y-direction when the object is at angle $\beta$.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 2:
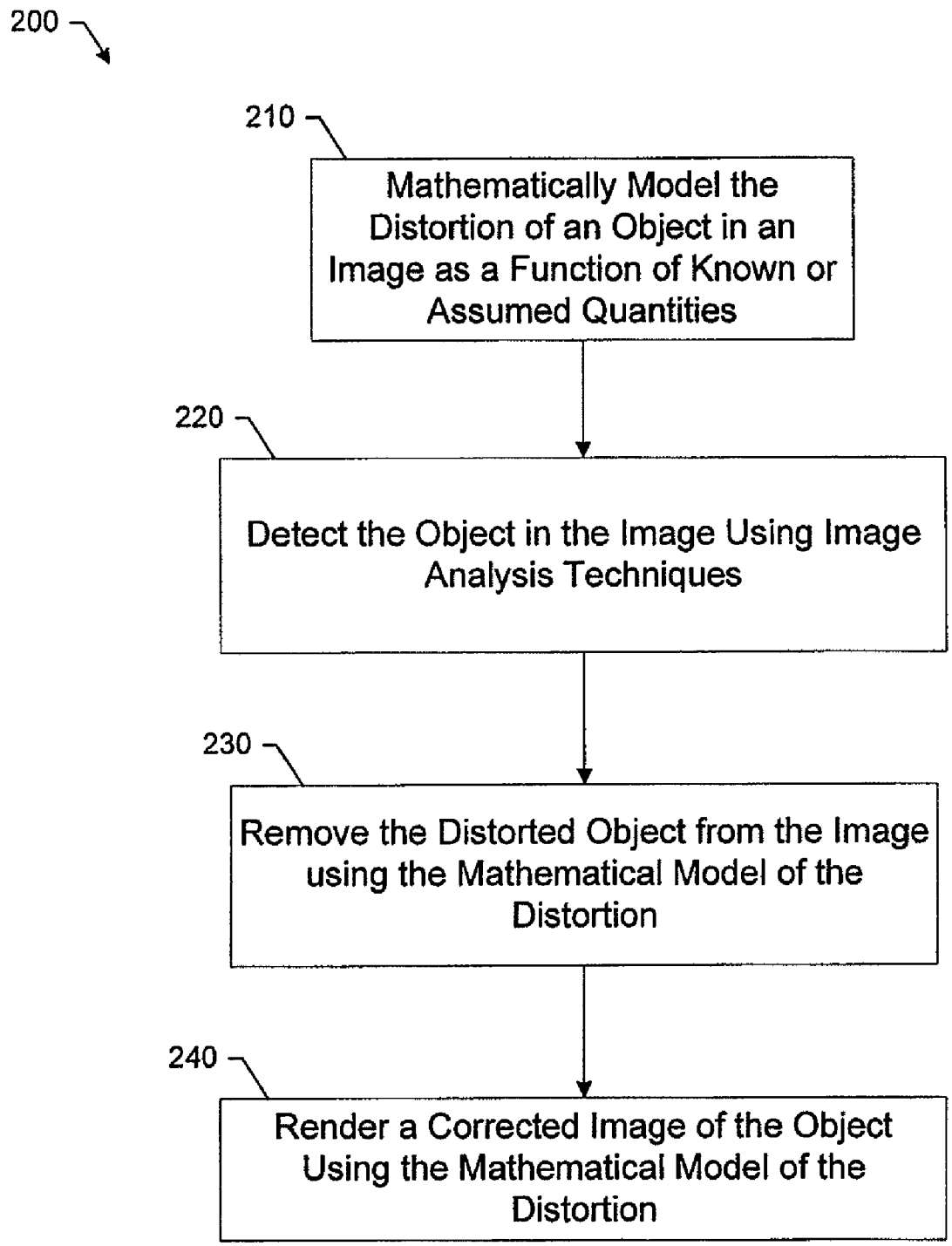
FIG. 2 is a flow chart for correcting a distorted image of an object where the distortion is the result of using a rolling shutter image sensor to capture an object moving relative to the sensor, according to one embodiment of the present invention.

FIG. 2 is a flow diagram of a method 200 for correcting a distorted image of an object where the distortion or "motion skew" is the result of using a rolling shutter sensor to capture an object moving relative to the sensor, according to one embodiment of the present invention. As illustrated by block 210, the process 200 includes creating a mathematical of the motion skew in the object image. The mathematical model may be created based on what is known or can be assumed about the object, the object's motion, and the image sensor. Preferably the mathematical model can be used to calculate at least an approximation of the motion skew in the image as a function of known, discoverable, or assumed properties, such as the velocity of the object during the exposure of the image, the rolling shutter rate, the dimensions of the object, and/or the orientation of the object. In some embodiments, the mathematical model of the motion skew of an object in a frame of a video is generated automatically by a processing device analyzing one or more of the frames in the video. In other embodiments, the mathematical model is generated using human input.

As illustrated by block 220, the process 200 further includes detecting the distorted image of the moving object in the image. Various image analysis techniques known in the art may be used to detect the object in the image. The object detection process may detect the object using only the single image or frame, or the object detection process may detect the object using a plurality of other frames in a video taken just before or after the current frame, if the current frame is part of the video. In some embodiments of the present invention, the process of detecting the object in the image uses the mathematical model of the distorted object. In some embodiments of the invention, information is gathered from the object detection process for use in assigning values to parameters in the mathematical model of the motion skew in order to compute a representation of the distorted object image, the representation of the distorted object image comprising an approximate shape and location of the distorted object image in the image. For example, the computed representation of the distorted object image may comprise image coordinates of an approximation of the distorted object image.

As illustrated by block 230, the process further comprises removing the distorted object from view in the image. The image of the distorted object may be removed from view using a number of techniques in combination with the mathematical model and information gathered from the object detection process 220. In one embodiment, the information gathered about the location of the object in the image is entered into the mathematical model in order to create a geometric representation of the distorted object image which is then used to create a removal mask. The removal mask removes or covers the pixels of the distorted object in the image. The area removed or covered by the mask may then be replaced with pixels from another image, such as from an immediately preceding or subsequent frame in a video if the image being corrected is part of a video or other rapid succession of images. In other embodiments, the area removed or covered by the removal mask is filled with pixels that are generated based on pixels in the image surrounding the removal area.

As illustrated by block 240, the process also includes rendering a new image of the object in the overall image using the mathematical model of the motion skew. For example, the mathematical model maybe used to translate pixels of the distorted image to new locations in the image in order to form a corrected, or at least a more natural looking, object in the image.

The process 200 illustrated in FIG. 2 will now be described below in greater detail according to one exemplary embodiment of the present invention. In particular, embodiments of the present invention will now be described as they pertain to correcting the motion skew in the image 150 of the golfer 165 swinging the golf club 160 illustrated in FIG. 1b, where the image of the golf club is skewed due to the use of a rolling shutter image sensor. For purposes of this embodiment, it is assumed that the rolling shutter image sensor begins sequentially exposing rows of pixels at the top 154 of the image and proceeds towards the bottom 153 of the image row-by-row, each row being a group of pixels having a common y-coordinate value, where the y-axis is defined as the axis of the image perpendicular to the rows of pixels that the rolling shutter image sensor sequentially exposes. In the image depicted in FIG. 1b, the y-axis runs up and down, parallel to the left and right sides 151 and 152, respectively, of the image 150.

Although embodiments of the invention now will be described as applied to the problem of correcting motion skew in an image of a golf club in a frame of a golf training video, similar techniques may be used in other embodiments of the invention for correcting motion skew in other images and videos. Thus, embodiments of the present invention are not to be limited to correcting motion skew in a golf club video, unless specifically claimed as such.

Figure 1A:
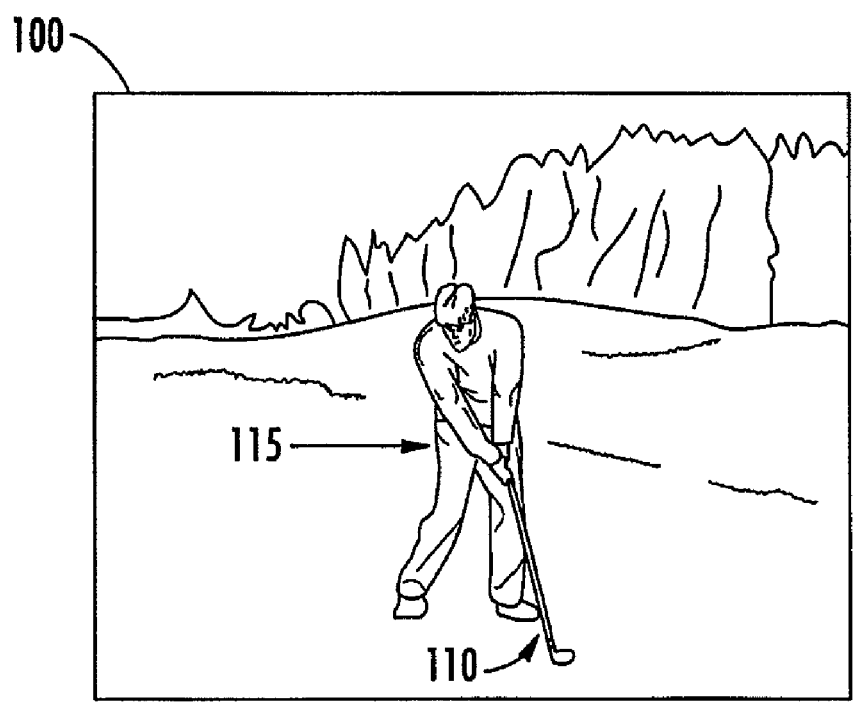
FIG. 1a illustrates how a frame of a video, or some other image, may appear if the image is captured using a global shutter image sensor.
Figure 1B:
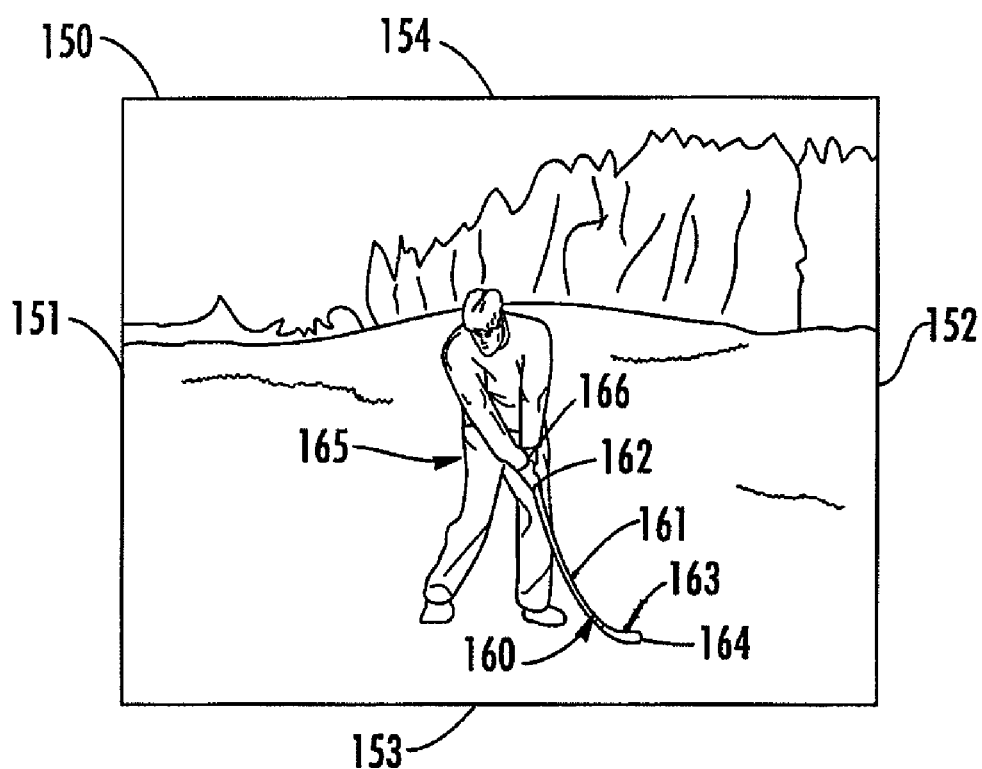
FIG. 1b illustrates how a frame of a video, or some other image, may appear if the image is captured using a rolling shutter image sensor.
Figure 3:
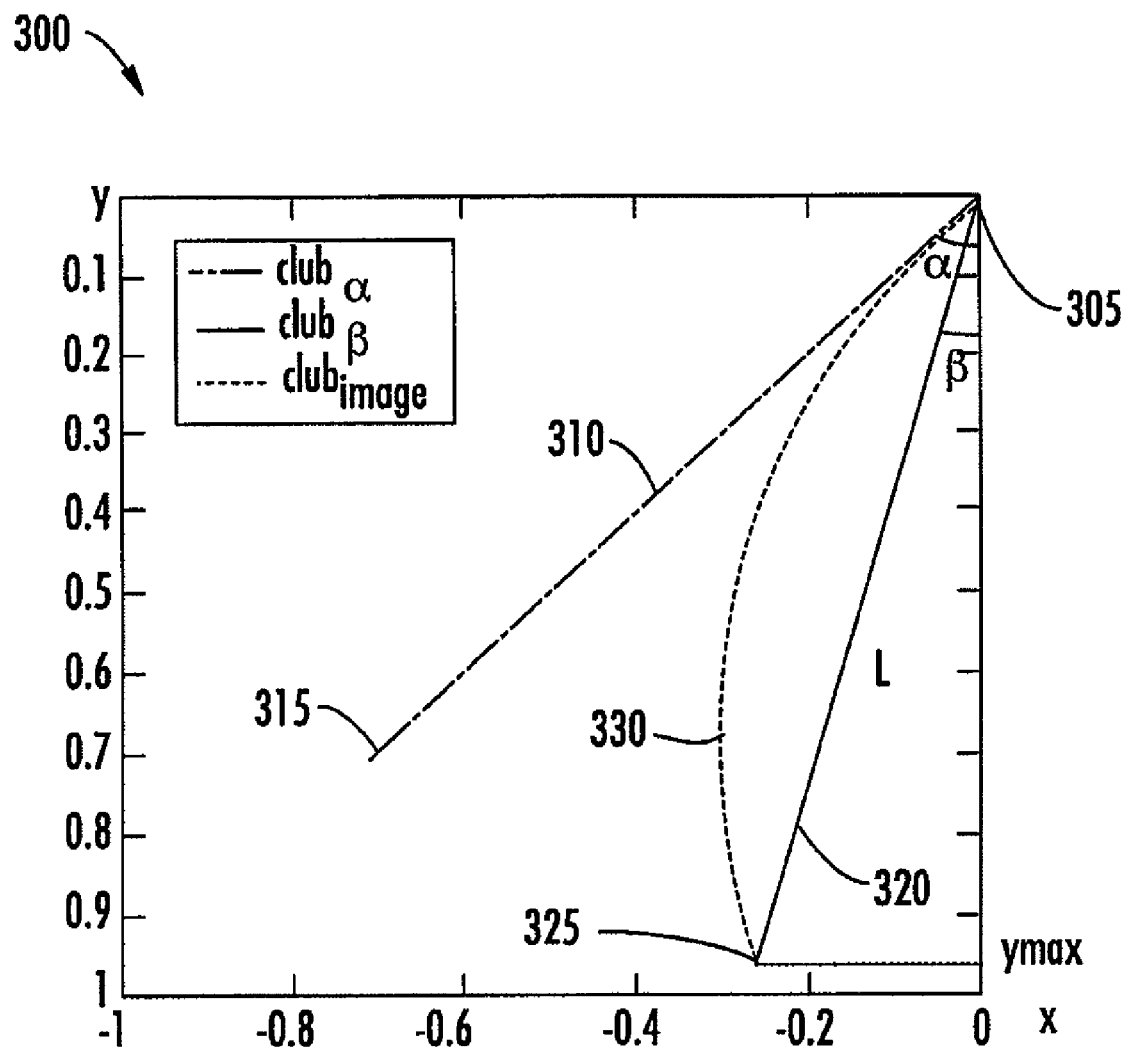
FIG. 3 illustrates a mathematical model of the motion skew in an image of a moving golf club captured by a rolling image sensor, determined in accordance with one embodiment of the present invention.

In this regard, FIG. 3 illustrates a graphical view 300 of a mathematical model of the motion skew of a golf club image where the image of a swinging golf club is captured using a rolling image sensor, according to one embodiment of the present invention. For example, FIG. 1b shows such an image of golfer swinging a golf club where the image has been captured using a rolling shutter image sensor. In the illustrated embodiment, the club length L in the model is normalized, and therefore has a value of 1, and a first end 305 of the golf club is considered to have x- and y-coordinates of (0, 0). Note that, in this embodiment, it is not required that the "end" of the club in the mathematical model be the actual end of the real golf club. Instead, the end of the club could be considered some other point on the golf club captured by the image. For example, a point on the club proximate to where the golf club meets the golfer's hands may be used as the first end 305 of the golf club in the mathematical model. In the illustrated embodiment described below, the first "end" 305 of the club in the mathematical model is selected as the point 162 in the image 150 of FIG. 1b, where the golf club shaft 161 meets the golfer's hands 166. This point is chosen since the real pivot point of the club may be under the golfer's hands and because the club distortion is not very noticeable in the region proximate the user's hands. Similarly, the "club length" need not be the actual length of the real club and, instead, is adjusted based on the two points in the image that are considered the first and second "ends" of the club. In the mathematical model described herein, the first end 305 of the golf club in the model is considered to be point 162 in the image 150 and the second end 325 of the golf club in the model is considered to be point 163 in the image 150 (where the golf club shaft 161 meets the golf club head 164).

In FIG. 3, the $club_\alpha$ line 310 denotes the assumed real club position at the start of the club exposure, when the club is at an angle $\alpha$ relative to the y-axis. $Club_\alpha$ line 310 has a club length L, which has a value of 1 since the coordinates have been standardized so that the club length L is equal to 1. $Club_\alpha$ line 310 may extend linearly at an angle defined by, e.g., tangent to, that portion of the $club_{image}$ line 330 proximate the first end 305. The $club_\beta$ line 320 denotes the assumed real club position at the end of the club exposure, when the club is at an angle $\beta$ relative to the y-axis. $Club_\beta$ line 320 also has a club length L having a value of 1 and may extend linearly between the first end 305 and the second end 325 of the $club_{image}$ line 330. The $club_{image}$ line 330 denotes the motion skew of the resulting club image and is plotted on the graph according to the mathematical model described herein below.

As can be seen from FIG. 3, the model illustrated in FIG. 3 assumes that the only club motion during exposure of the golf club 160 in this frame 150 is the rotation about the end 305 of the club. The model also assumes that the golf club 160 moves at a constant angular velocity during the exposure of the golf club 160 in the current frame 150. In this regard, it is assumed that the club moves from angle $\alpha$ to angle $\beta$ during the exposure of the club with the angular separation between angle $\alpha$ and angle $\beta$ defined by the angular velocity of the golf club, as illustrated in FIG. 3.

Using the mathematical model depicted in FIG. 3, a mathematical function defining $club_\alpha$ 310 can be stated as a function of y and angle $\alpha$:

$$x_\alpha = y \tan(\alpha),$$

and similarly the function for $club_\beta$ 320 can also be stated as a function of y and angle $\beta$:

$$x_\beta = y \tan(\beta).$$

Since the rolling shutter action sequentially exposes rows of pixels (each row of pixels having a constant y-coordinate) and because it is assumed that the rate of the rolling shutter is constant, the time of exposure of each portion of the golf club (i.e., when each portion along the length of the club is captured by the image sensor relative to when other portions along the length of the golf club are captured) is linearly dependant on y. Furthermore, as described above, the angular velocity of the club is assumed to be constant during the exposure of the golf club. Therefore, the function for the golf club angle (angle$_{image}$) during the exposure of the golf club in terms of y is:

$$\text{angle}_{image} = \alpha(y_{max}-y)/y_{max} + \beta y/y_{max},$$

where the value $y_{max}$ is the y-coordinate of the end 325 of club$_\beta$ 320, which is also the y-coordinate of the end of club$_{image}$ 330. In other words, the angle of the golf club changes from $\alpha$ to $\beta$ linearly as $y_{image}$ advances from 0 to $y_{max}$. Thus, the function defining club$_{image}$ line 330 is:

$$x_{image} = y \tan(\text{angle}_{image}) = y \tan(\alpha(y_{max}-y)/y_{max} + \beta y/y_{max}).$$

Therefore, the above function defines the motion skew of the distorted image of the club. However, in order to calculate the motion skew in a given situation, values must be obtained for the various parameters in the function, such as $y_{max}$, $\alpha$, $\beta$, and the proper location of the coordinate axes in the image. Such information is dependent on information in the image and can be gathered from or calculated based on information gathered from the image itself. Thus, as described above, in embodiments of the present invention, the process for correcting the motion skew in an image involves detecting the golf club, or other object, in the image and gathering information about the object and/or its motion.

In one embodiment, $y_{max}$, $\beta$, and the proper location of the coordinate axes is determined by the location of the first end 166 and the second end 163 of the skewed golf club shaft image 161 depicted in image 150. In one embodiment, the user enters the coordinates for the first end 166 and the second end 163 of the skewed golf club shaft 161. For example, in one embodiment of the present invention, the image 150 is presented on a display of an electronic device and the user inputs coordinates for the ends of the golf club by moving the cursor to coincide with the points and selecting the points in the image 150 presented on the display. Referring to FIG. 1b, the user may click on the golf club shaft 161 at the point 162 where the golf club 160 meets the golfer's hands 166 so that this point is used as the first end 305 of the golf club in the mathematical model shown in FIG. 3. The user may also click on the shaft 161 of the club 160 at the point 163 where the golf club shaft 161 meets the golf club head 164 so that this point is used as the second end 325 of the skewed golf club image 330 in the mathematical model shown FIG. 3.

In other embodiments of the present invention, image analysis software may be used to detect the first and second ends of the golf club or the golf club shaft for use in the mathematical model. Various image analysis techniques are known in the art that can detect the location of an object in an image. For example, in one embodiment, an edge detection algorithm, such as a Canny edge detection algorithm, may be applied to the image 150 in order to detect the shaft of the golf club 160. For example, once an edge detection algorithm is applied to the image 150 the system may be configured to look for two close parallel edges having a certain length or position in order to detect the golf club shaft 161. The first and second ends may then be set to the ends of these parallel lines. Which end of the parallel lines represents the first end and which is the second end may be chosen based on the relative location of each end in the image or may be based on further analysis of the image to determine which end is connected to the golfers hands or which end is connected to the golf club head. In one embodiment, where the image 150 being corrected is a frame of a video comprising a plurality of frames, the current frame may be compared to a preceding or a subsequent frame in order to determine which end should be set as the first end and which end should be set as the second end in the model of FIG. 3.

Another, method for detecting a golf club shaft in an image that is designed to reduce the number of false detections is described in the paper entitled *Visual Golf Club Tracking for Enhanced Swing Analysis* by Nicolas Gehrig, Vincent Lepetit, and Pascal Fua of the Computer Vision Laboratory of the Swiss Federal Institute of Technology, which is incorporated in its entirety herein by reference. This method may be used where the image 150 being corrected is a frame of a video comprising a plurality of other frames. The paper describes how the difference between the current image 150 and the image in the previous frame can be computed as the Euclidian distance in the YUV color space, or some other color space. The result can then be thresholded to produce a binary mask representing the moving objects between these two frames. The same operation may then be applied to a comparison of the current frame and the next frame, producing a second binary mask. A logical bitwise AND operation between these two masks provides a mask of the moving objects in the current frame. Then, an edge detection algorithm, such as a Canny edge detection algorithm, may be applied on the mask of the moving objects in the current frame and, as described above, the resulting edges can be analyzed in order to detect the shaft of the golf club. Other suitable systems and methods for detecting specific objects in a still image or in a video frame will be apparent to one of ordinary skill art in view of this disclosure.

Once the first and second ends 162 and 163 of the club 160 are located in the image 150, the angle $\beta$, $y_{max}$, and the club length can be determined. Specifically, since the model described above assumes that the golf club only rotates about its first end during the exposure of the club, a straight line drawn from the first end 162 of the skewed club 160 to the second end 163 of the skewed club 160 forms the club$_\beta$ line 320 having length L and positioned at angle $\beta$ relative to the y-axis of the image. The value of $y_{max}$ can then be calculated by taking the cosine of angle $\beta$, where the coordinates have been standardized such that the club length is equal to 1.

The angle $\alpha$ and the club$_\alpha$ line 310 can then be determined by calculating the angular amount ($\alpha-\beta$) that the golf club rotated about its end 305 during the time that it took the rolling shutter image sensor to expose the full length of the club. This angle ($\alpha-\beta$) can be calculated based on the rate of the rolling shutter action ($t_{shutter}$) and the current angular velocity of the club ($\theta_{club}$) during the time that the golf club was exposed. Thus the angle $\alpha$ can be calculated using the following formula:

$$\alpha = \beta - (\theta_{club} t_{shutter} \text{height}_{club\beta}).$$

The rate of the rolling shutter action, $t_{shutter}$, is the time that it takes the rolling shutter image sensor to expose one row of pixels and move on to the next row of pixels to expose. In other words $t_{shutter}$ may be defined as a unit of time, such as seconds or micro seconds, per row of pixels. The height$_{club\beta}$ is the height along the y-axis of club$_\beta$ 320 in terms of pixels. In the illustrated example, the angular velocity of the club ($\theta_{club}$) is negative.

The angular velocity $\theta_{club}$ or an approximation thereof may be entered by the user or, if the image is a frame in a video, may be calculated based on analysis of other frames in the video. For example, in one embodiment of the application, the angular velocity of the golf club is approximated based on a comparison of the location of some portion of the golf club, such as the golf club head, in the current frame of interest to the location of the golf club portion in a different frame, such as a frame immediately preceding or subsequent to the current frame. The angular distance that the portion of the golf club traveled between frames relative to the end of the golf club can then be divided by the time difference between the exposures of the golf club portion in the two frames in order to obtain the angular velocity. Other image analysis systems and methods known in the art may be used to determine at least an approximation of the angular velocity of the golf club during the exposure of the golf club, and such methods and systems would be apparent to a person having ordinary skill in the art in view of this disclosure.

Figure 4:
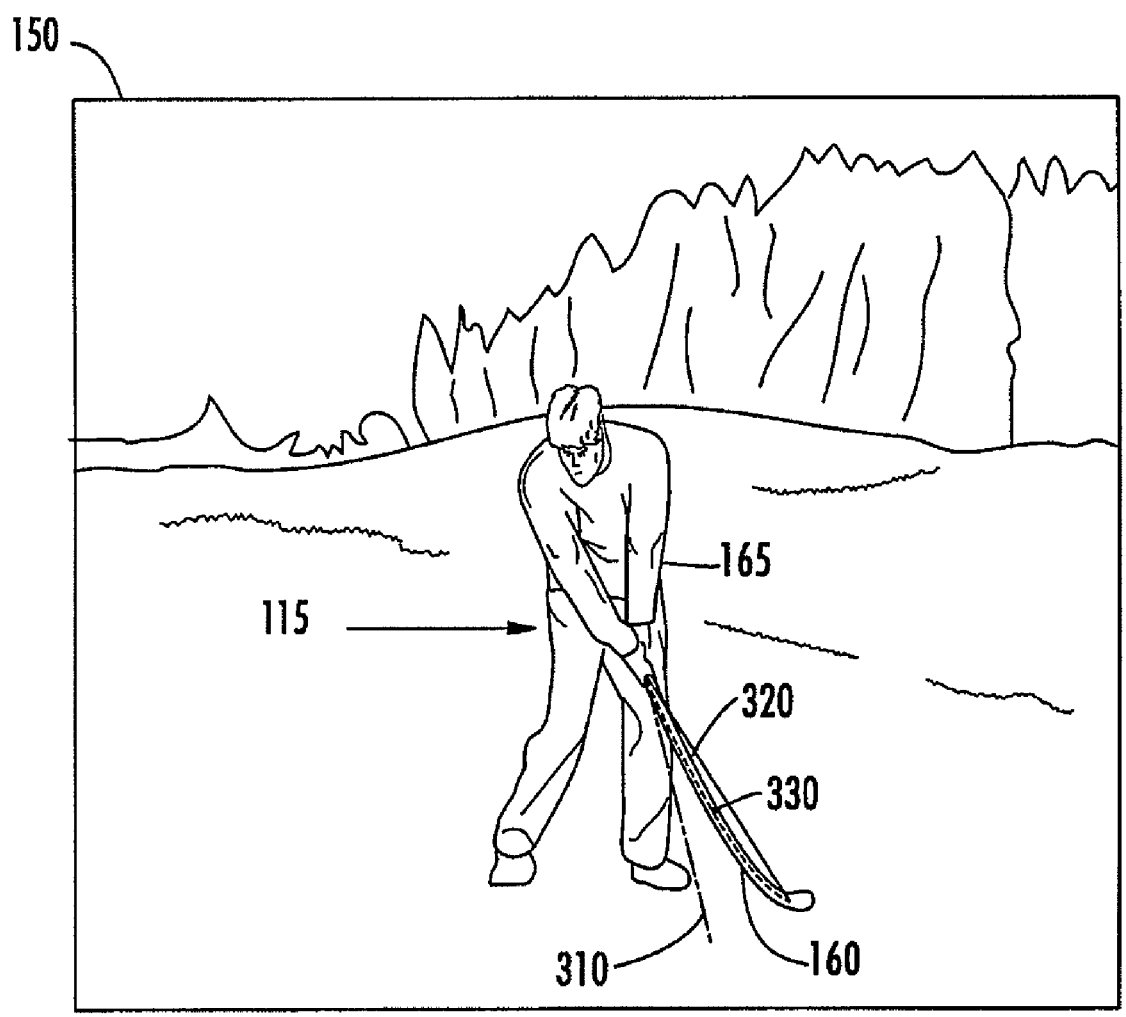
FIG. 4 illustrates the club positions and the motion skew model overlaid onto the image of the golfer of FIG. 1b, according to one exemplary embodiment of the present invention.

FIG. 4 illustrates the image of FIG. 1b, where the mathematical model described above has been used to calculate a geometric representation of the motion skew in the golf club shaft image 161. The club$_\alpha$ line 310, the club$_\beta$ line 320, and the club$_{image}$ line 330 have been overlaid over the image 150 to show how the mathematical model relates to the distorted golf club image 160. As described above, for purposes of this model, the first end of the club, and thus the origin of the x- and y-axes in the mathematical model, has been selected as the point in the image where the golf club shaft meets the golfer's hands. The second end of the golf club has been selected as the point in the image where the golf club shaft meets the golf club head. The club$_\beta$ line 320 represents the approximate position of the actual golf club at the time when the image sensor finished exposing the last pixel of the image of the golf club shaft 161. As described above, the club$_\beta$ line 320 may be generated based on the detected locations of the first and second ends of the golf club 160. The club$_\alpha$ line 310 represents the approximate position of the golf club at the time that the image sensor began exposure of the first pixels of the golf club. As described above, club$_\alpha$ line 310 may be calculated based on the club$_\beta$ line 320 and on the approximate angular velocity of the golf club during the club's exposure and the approximate time that it took the rolling shutter action of the image sensor to expose the full image of the golf club 160. The club$_{image}$ line 330 represents the calculated motion skew of the distorted golf club shaft image 161. As described above, the club$_{image}$ line 330 may be calculated based on the above described mathematical functions. As can be seen in the FIG. 4, club$_{image}$ line 330 closely models the distortion in the golf club shaft 161.

Figure 5:
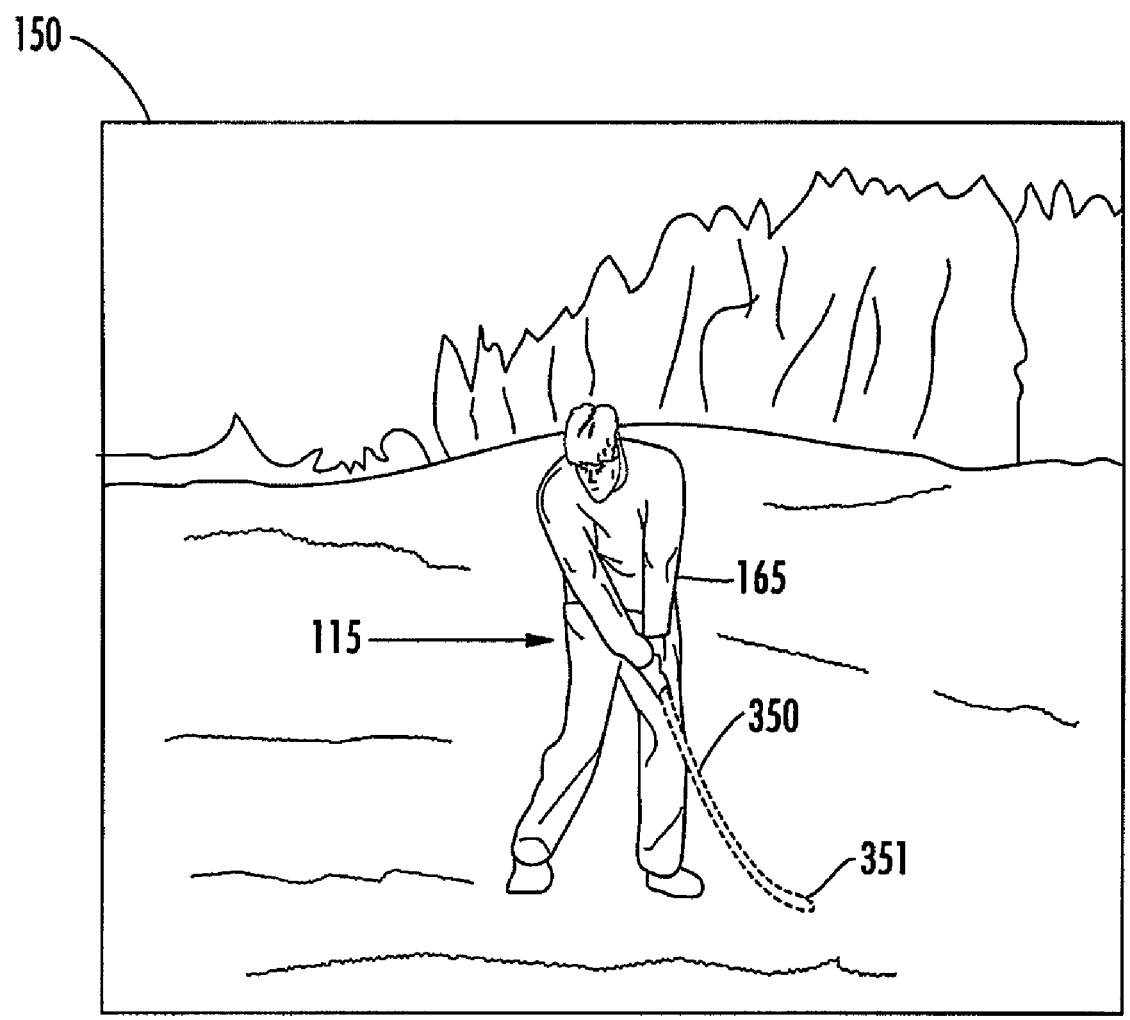
FIG. 5 illustrates the image of the golfer of FIG. 1b having a club removal mask applied over the distorted golf club image, according to one embodiment of the present invention.

Once the motion skew of the golf club has been modeled and calculated for the current frame of the video, the calculated motion skew can be used to define the area of the image that contains the distorted golf club image 160 and that should be removed from view in the image. For example, as shown in FIG. 5, a mask may be used to draw a white line 350 along the calculated club$_{image}$ line 330, the width of the line 350 being wider than the width of the golf club shaft 161, such as two or three times wider. A separate shape 351 can be applied to remove the club head 164 from view in the image. In one embodiment, the club head mask shape is generated automatically based on a detected shape of the club head. In other embodiments of the present invention, club head mask is created based on club head shape and location input entered by the user. These removal masks may comprise soft edges in order to cancel the effects of possible errors in the calculation of the motion skew and noise in the image. In one embodiment of the present invention, the masks are generated using image processing software and techniques that are readily apparent to one having ordinary skill in the art in view of this disclosure.

Figure 6:
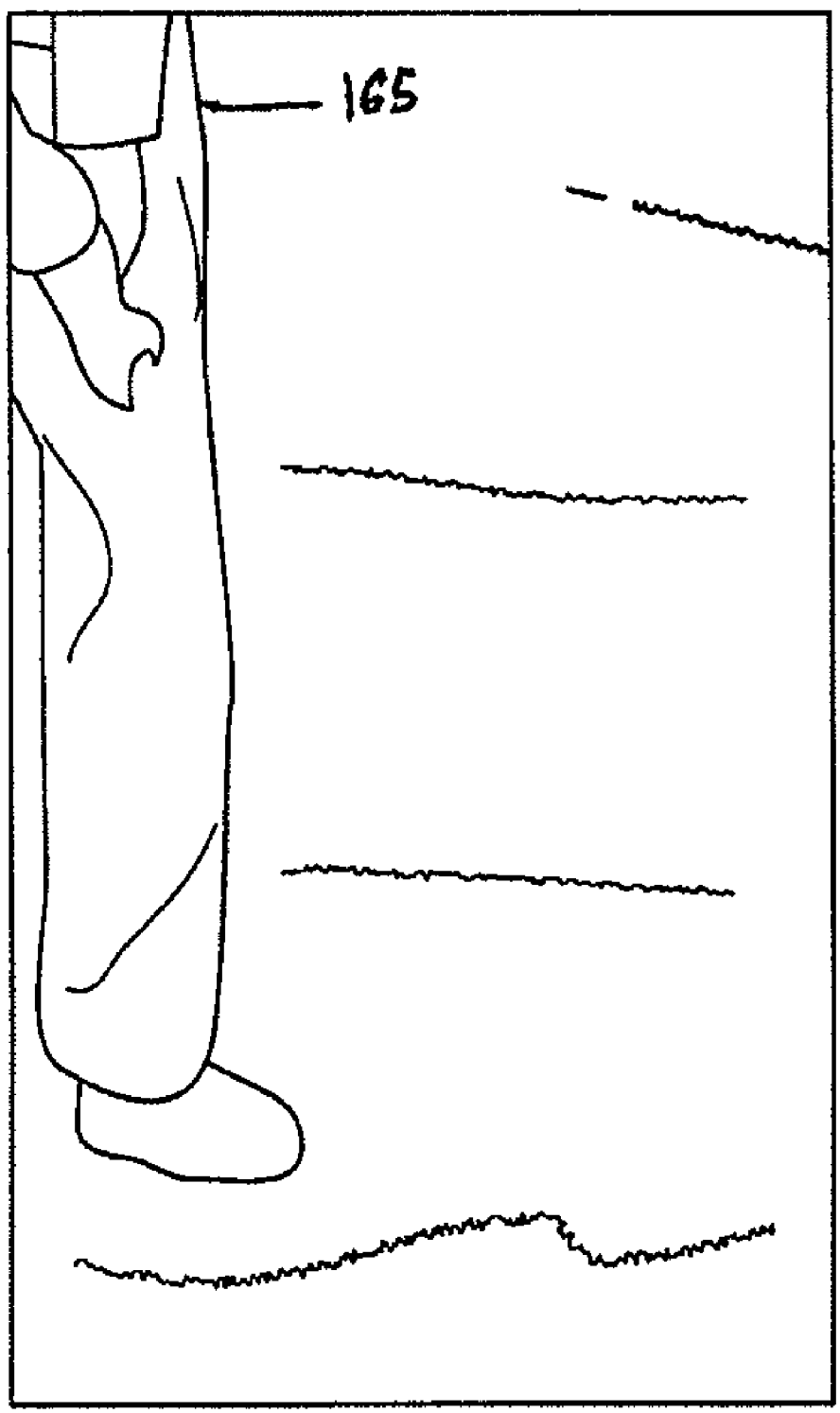
FIG. 6 illustrates a portion of the image of FIG. 5 showing the image where pixels from other frames in the video have been used to fill in the removal mask area shown in FIG. 5, according to one embodiment of the present invention.

The pixels in the areas 350 and 351 defined by the removal masks may then be filled with new colors in order to blend the area into the background. In one embodiment of the present invention, image analysis software and techniques are used to generate new pixels for this area based on an analysis of the pixels surrounding the areas 350 and 351 and algorithms that extend the colors of the surrounding pixels into the areas 350 and 351. Suitable image analysis software and techniques will be apparent to one of ordinary skill in the art in view of this disclosure. In another embodiment of the present invention, where the image 150 is one frame in a video, the pixels may be generated in the areas 350 and 351 based on pixels in corresponding areas of a previous or a subsequent frame in the video. For example, the same mask that is used to remove the pixels of the distorted golf club 160 from view in the current frame could be used to copy pixels in the same areas of a preceding or subsequent frame and then insert the copied pixels into the areas 350 and 351. In general, when motion skew is present in a golf swing video, the golf club is moving at such a speed that pixels from the immediately previous or subsequent frame can be used to fill the areas 350 and 351 since there will generally be no club color in these pixels. If such is the case, the immediately preceding or subsequent frames may be preferable since other objects and colors in these frames in the regions corresponding to the removal masks 350 and 351 will be very close to what would have been in the regions behind the club in the current frame. FIG. 6 illustrates a zoomed in portion of the image of FIG. 5 except that the areas 350 and 351 shown in FIG. 5 have been filled in FIG. 6 with pixels from another frame in the video.

Figure 7:
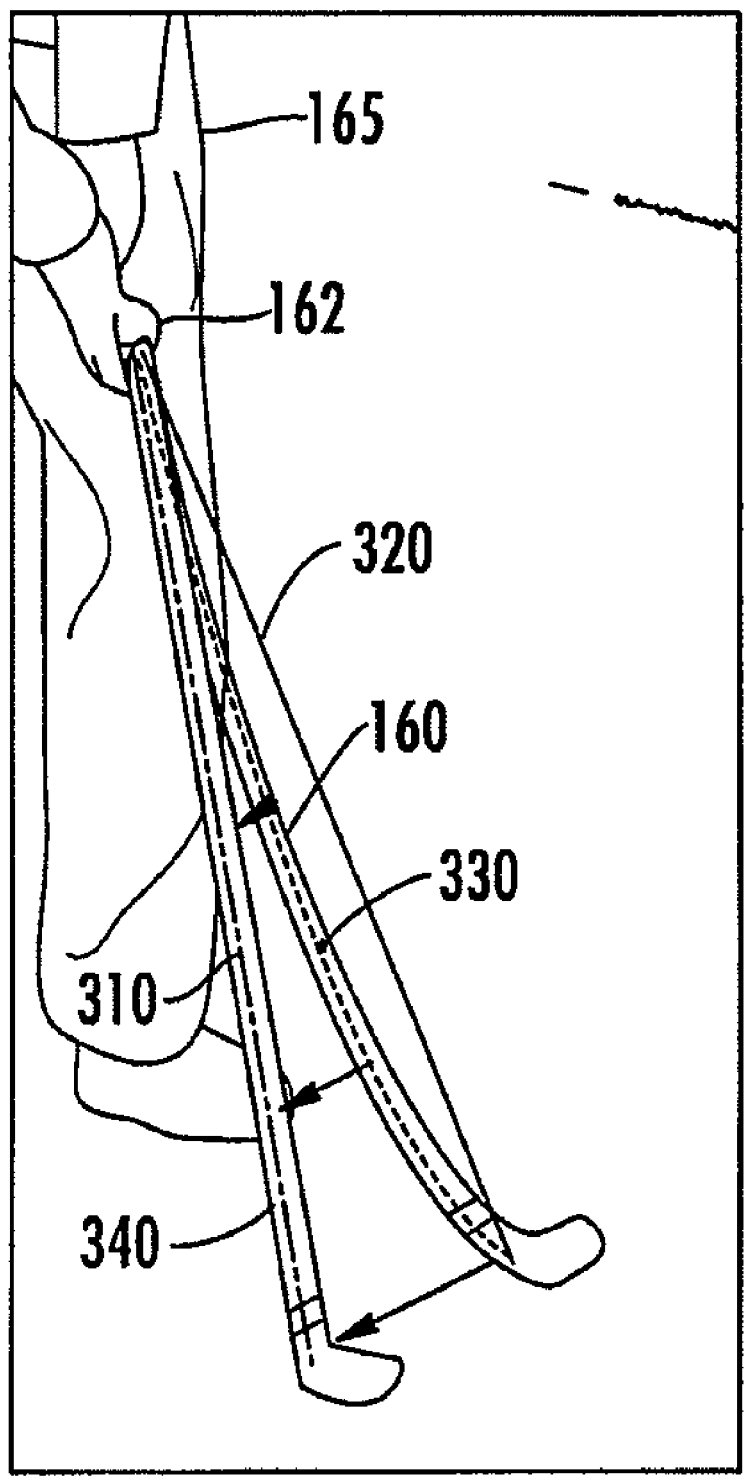
FIG. 7 illustrates a portion of the image of FIG. 4 showing how the pixels that comprise the distorted golf club image may be translated according to the motion skew model in order to render a corrected golf club image, in accordance with one embodiment of the present invention.
Figure 8:
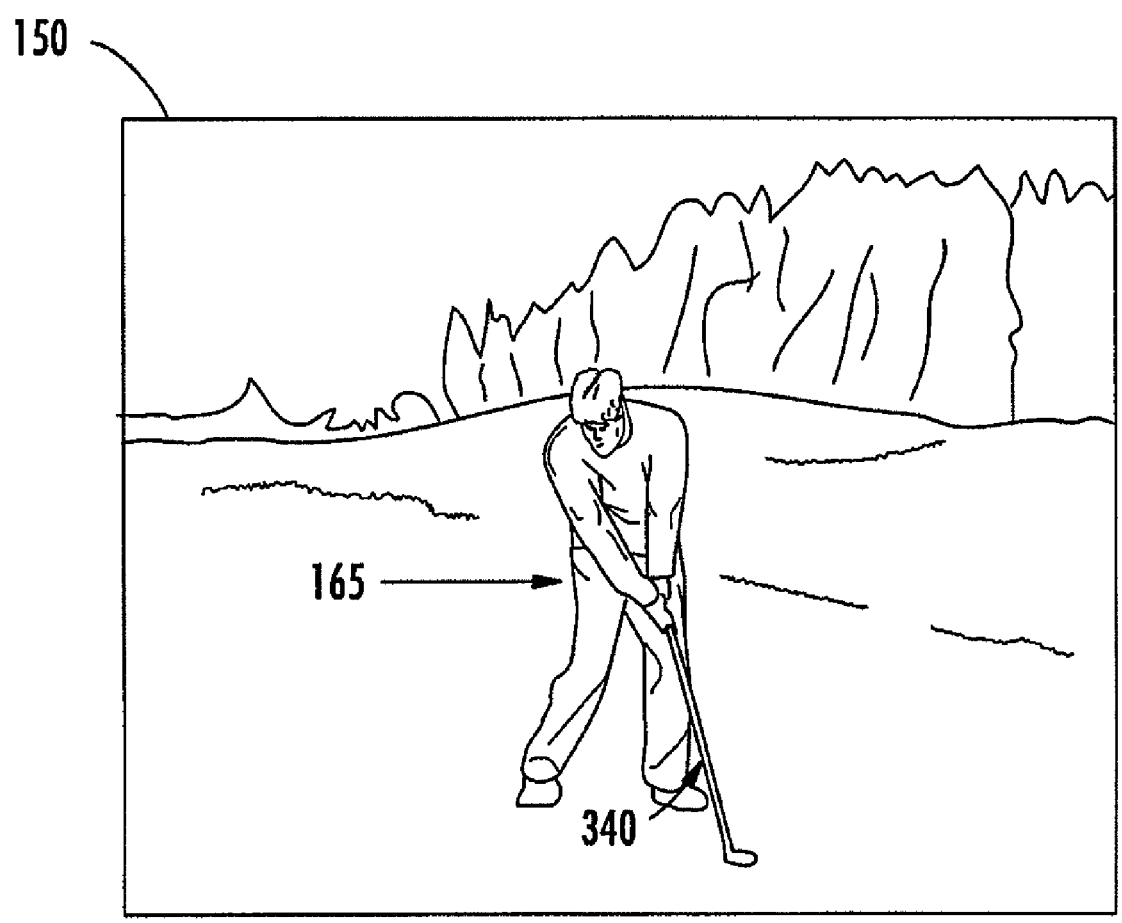
FIG. 8 illustrates an image where the motion skew of the golf club has been corrected using an embodiment of the present invention.

The motion skew model can also be used to generate a corrected image of a golf club in the frame of the video. Note that, when the term "corrected image" is used, it is not meant to necessarily mean that the generated image of the golf club accurately represents exactly how the golf club appeared in reality at any given time. Instead the term "corrected image" is meant to refer to the modified image of the golf club, or other object, where the modified image is generally more correct, or at least is a more natural looking image, of a swinging golf club than the image distorted by the motion skew effect. As shown in FIG. 7, a corrected image 340 of the golf club 160 may be rendered by geometrically translating the pixels of the distorted golf club image 160 from the club$_{image}$ line 330 to the club$_\alpha$ line 310. For example, the pixels along or in the vicinity of the club$_{image}$ line 330 and that are located a particular distance away from the first end 162 (305 in FIG. 3) of the club may be translated to an area located the same distance from the first end 162/305 but along the club$_\alpha$ line 310. In other embodiments, the pixels of the distorted golf club image are instead translated, according to the mathematical model, to the club$_\beta$ line 320 or to any other line located between the club$_\alpha$ line 310 and the club$_\beta$ line 320. FIG. 8 illustrates the image 150 in which the distorted golf club image has been removed and a corrected golf club image 340 has been rendered using an embodiment of the present invention described above.

In embodiments of the present invention, the procedure described above is implemented in an electronic device, such as the electronic device described below with reference to FIG. 9. The electronic device may be the same electronic device that is used to capture the video or other image that is processed by embodiments of the above described procedure. In other embodiments, the electronic device is a different device than the device used to capture the video or other image and instead merely processes the image or video in accordance with embodiments of the above described procedure. In one embodiment, the process of detecting the object in the image, extracting information from the image and/or from a plurality of frames in a video, calculating the motion skew of the object, removing the distorted object image from view in the image, and rendering a corrected image of the object is all done automatically, such as by a processor of the electronic device, without user input. In other embodiments, user input is required at one or more of the steps in the process.

Figure 9:
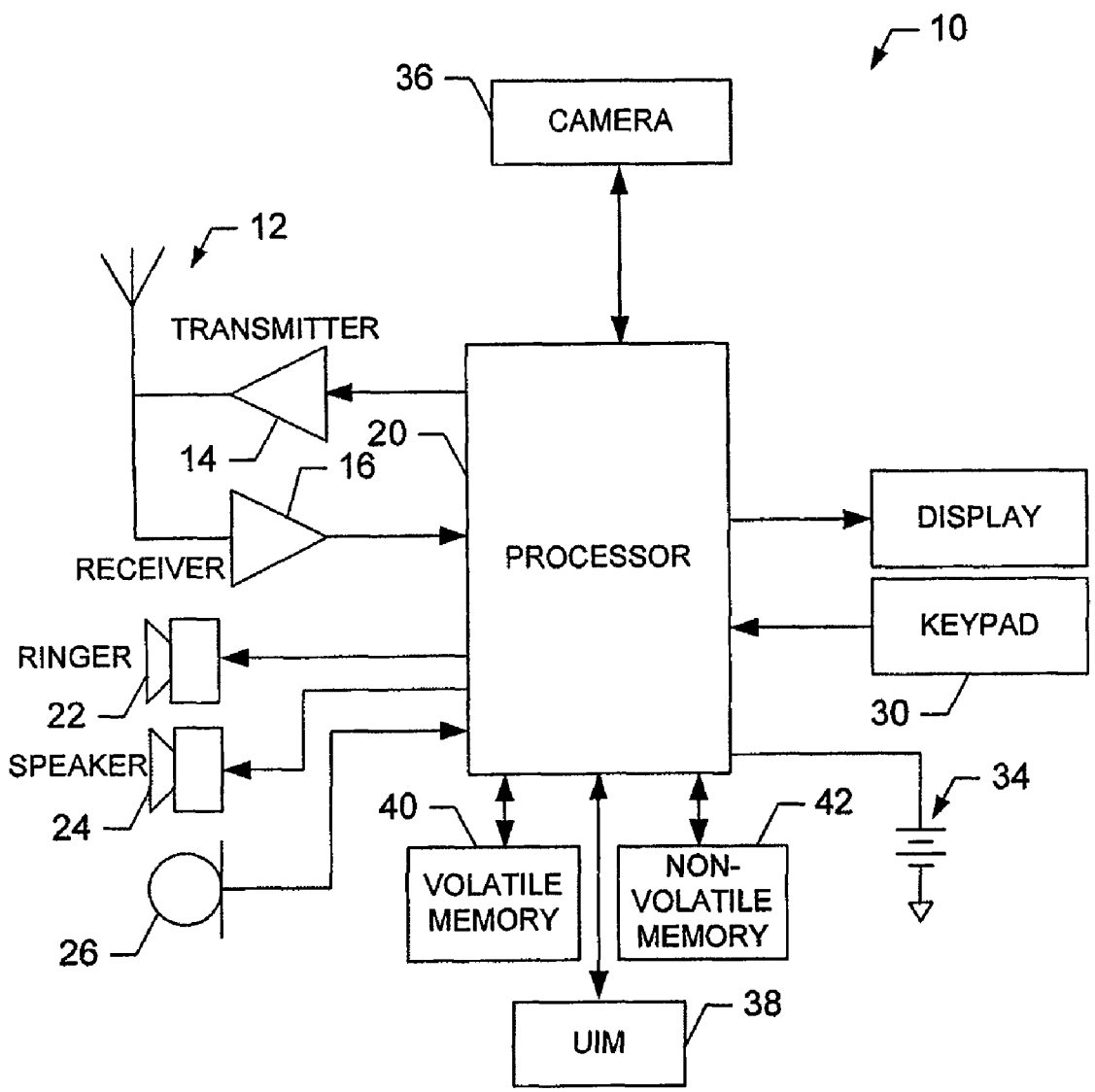
FIG. 9 illustrates a schematic block diagram of a mobile terminal that may implement embodiments of the present invention.

FIG. 9 illustrates a block diagram of an electronic device, and specifically a mobile terminal 10, that may perform the various functions described above including those set forth in FIG. 2. While several embodiments of the mobile terminal 10 are illustrated and will be hereinafter described for purposes of example, other types of electronic devices, such as digital cameras, portable digital assistants (PDAs), pagers, mobile televisions, computers, laptop computers, and other types of systems that manipulate and/or store data files, can readily employ embodiments of the present invention. Such devices may or may not be mobile.

The mobile terminal 10 includes a communication interface comprising an antenna 12 in operable communication with a transmitter 14 and a receiver 16. The mobile terminal 10 further includes a processor 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA) or third-generation wireless communication protocol Wideband Code Division Multiple Access (WCDMA).

It is understood that the processor 20 includes circuitry required for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 can additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a camera 36 in communication with the processor 20. The camera 36 may be any means for capturing an image for storage, display or transmission. For example, the camera 36 may include a digital camera capable of forming a digital image file from a captured image. As such, the camera 36 includes all hardware, such as a lens or other optical device, and software necessary for creating a digital image file from a captured image. Alternatively, the camera 36 may include only the hardware needed to view an image, while a memory device of the mobile terminal 10 stores instructions for execution by the processor 20 in the form of software necessary to create a digital image file from a captured image. In an exemplary embodiment, the camera 36 may further include a processing element such as a co-processor which assists the processor 20 in processing image data and an encoder and/or decoder for compressing and/or decompressing image data. The encoder and/or decoder may encode and/or decode according to a JPEG standard format. The camera may include a rolling shutter image sensor that captures images using a rolling shutter technique. The camera may include a CMOS image sensor.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

The above described procedures and functions may be carried out in many ways. For example, any suitable means for carrying out each of the functions described above may be employed to carry out embodiments of the invention. According to one aspect of the present invention, all or a portion of the systems or methods of embodiments of the present invention generally operate under control of a computer program product. The computer program product for performing the various processes and operations of embodiments of the present invention includes a computer-readable storage medium, such as a non-volatile storage medium, and computer-readable program code portions, such as a series of computer-readable instructions, embodied in the computer-readable storage medium. For example, in one embodiment, the processor of the electronic device described above generally executes a computer-readable code portion in order to perform one or more of the various functions described above with reference to analyzing and image and/or correcting motion skew in the image.

In this regard, FIG. 2 is a flowchart or block diagram of methods, systems, devices, and computer program products according to embodiments of the present invention. It will be understood that each block of a flowchart or each step of a described method can be implemented by computer program instructions. These computer program instructions may be loaded onto a computer or other programmable apparatus to produce a machine, such that the instructions which execute on the computer or other programmable apparatus create means for implementing the functions specified in the described block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the described block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the described block(s) or step(s).

It will also be understood that each block or step of described herein, and combinations of blocks or steps, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
computing, with a processor, a representation of a distorted object image using a mathematical model of motion skew from an image that comprises a frame in a video, the representation of the distorted object image providing an approximate shape and location within the image of the distorted object image;
removing the distorted object image from view in the image using the computed representation of the distorted object image;
replacing pixels in an area of the image where the distorted object image has been removed from view with pixels gathered from a corresponding area of a different frame in the video; and
rendering a corrected image of an object in the image using the computed representation of the distorted object image.

2. The method of claim 1, further comprising:
creating the mathematical model of the motion skew.

3. The method of claim 2, wherein creating the mathematical model of the motion skew comprises:
creating a second mathematical model of motion between the object and a rolling shutter image sensor at a time that the image was captured; and
using the second mathematical model of the motion of the object to create the mathematical model of the motion skew.

4. The method of claim 3, wherein the mathematical model of the motion skew is a function of velocity of the object relative to the rolling shutter image sensor during exposure of the object, and rate of a rolling shutter action of the rolling shutter image sensor.

5. The method of claim 1 further comprising:
detecting a distorted object image in the image.

6. The method of claim 5, wherein detecting the distorted object image further comprises:
analyzing the detected distorted object image; and
gathering information from the distorted object image;
and wherein the computing of the representation of the distorted object image using the mathematical model comprises:
using the gathered information as values for parameters in the mathematical model.

7. The method of claim 5, wherein the image comprises a frame in a video, and wherein detecting the distorted object image further comprises:
detecting at least a portion of the distorted object image in the frame in the video;
detecting at least a portion of the distorted object image in a different frame in the video; and
computing the velocity of the object by comparing the detected object portions of the two frames;
and wherein the computing of the representation of the distorted object image using the mathematical model comprises:
using the computed velocity of the object as a value of a parameter in the mathematical model.

8. The method of claim 1, wherein the removing of the distorted object image further comprises:
generating a mask for removing from view the distorted object image.

9. The method of claim 8, wherein generating a mask for removing from view the distorted object image comprises using the computed representation of the distorted object image to create the mask for removing the distorted object image from view in the image.

10. The method of claim 1, wherein the rendering of the corrected image of the object further comprises:
using the mathematical model of the motion skew to translate pixels of the distorted object image to locations in the image that form the corrected image of the object.

11. The method of claim 1, wherein the rendering of a corrected image of the object comprises rendering the corrected image of the object to form the image of the object as the object appeared at a time proximate when the object was first exposed by a rolling shutter image sensor when capturing the image.

12. The method of claim 1, wherein the image of the object is captured by a rolling shutter image sensor embodied in a device configured to capture video, and wherein the image comprises the frame in the video.

13. The method of claim 1, wherein the object comprises a straight elongate object having a first end and a second end, wherein the object is moving about the first end relative to a rolling shutter image sensor during exposure of the object by the image sensor, wherein the object moves from a first angle ($\alpha$) to a second angle ($\beta$) during the exposure of the object by the image sensor, wherein the method further comprises creating of the mathematical model by:
  providing x- and y-coordinate axes to the image so that the y-axis is perpendicular to rows of pixels sequentially exposed by the rolling shutter image sensor;
  standardizing the x- and y-coordinates so that a Euclidean distance between the first end and the second end of the object has a value of 1;
  selecting a point in the image proximate the first end of the object; and
  assuming that the selected point is an origin of the coordinate axes;
  wherein the mathematical model of the motion skew is configured to be used to generate a representation of the distorted object image, the x-coordinate of which ($x_{image}$) is represented as a mathematical function of the y-coordinate (y) as y advances from 0 to $y_{max}$, where $y_{max}$ is the y-coordinate of the second end of the object when the object is at angle $\beta$, the mathematical function comprising:
  $x_{image} = y \tan(\alpha(y_{max}-y)/y_{max}+\beta y/y_{max})$, where the angle $\alpha$ is determined by a function $\alpha=\beta=(\theta_{club} t_{shutter} height_{club\beta})$, where $\theta_{club}$ is an angular velocity of the object during the exposure of the object, where $t_{shutter}$ is a time taken by the rolling shutter image sensor to expose each row of pixels before exposing a next row of pixels, where $height_{club\beta}$ is a height of the object in pixels in a y-direction when the object is at angle $\beta$, and where the coordinates are divided by the length of the object.

14. A computer program product comprising at least one computer-readable storage medium having computer-readable program code portions stored therein, the computer-readable program code portions comprising:
  a first executable portion for computing a representation of a distorted object image based on a mathematical model of motion skew from an image that comprises a frame in a video, the representation of the distorted object image providing an approximate shape and location within an image of the distorted object image;
  a second executable portion for removing the distorted object image from view in the image using the computed representation of the distorted object image, wherein the second executable portion is configured to replace pixels in an area of the image comprising the removed distorted object image with pixels gathered from a corresponding area of a different frame in the video; and
  a third executable portion for rendering a corrected image of an object in the image using the computed representation of the distorted object image.

15. The computer program product of claim 14, the computer-readable program code portions comprising:
  a fourth executable portion for generating a mathematical model of the motion skew.

16. The computer program product of claim 14, wherein the mathematical model of the motion skew is a function of velocity of the object relative to a rolling shutter image sensor during exposure of the object, and rate of a rolling shutter action of the rolling shutter image sensor.

17. The computer program product of claim 14, the computer-readable program code portions comprising:
  a fourth executable portion for detecting the distorted object image in the image.

18. The computer program product of claim 17, wherein the fourth executable portion further comprises:
  a fifth executable portion for analyzing the detected distorted object image and gathering information from the distorted object image;
  and wherein the first executable portion comprises:
  a sixth executable portion for computing the representation of the distorted object image from the mathematical model of the motion skew using the gathered information.

19. The computer program product of claim 17, wherein the fourth executable portion further comprises:
  a fifth executable portion for detecting at least a portion of the distorted object image in the frame in the video; detecting at least a portion of the distorted object image in a different frame in the video; and computing a velocity of the object by comparing the portions of the detected object images of the two frames;
  and wherein the first executable portion further comprises:
  a sixth executable portion for computing the representation of the distorted object image from the mathematical model of the motion skew using the computed velocity of the object.

20. The computer program product of claim 14, wherein the second executable portion further comprises:
  a fourth executable portion for creating a mask to remove the distorted object image from view in the image based at least partially upon the computed representation of the distorted object image.

21. The computer program product of claim 14, wherein the third executable portion further comprises:
  a fourth executable portion for translating pixels of the distorted object image to locations in the image that form the corrected image of the object using the representation of the distorted object image computed by the first executable portion.

22. An apparatus comprising:
  a processor; and
  a memory storing computer program code, wherein the memory and stored computer program code are configured, with the processor to cause the apparatus at least to:
  compute a representation of a skewed object image based on a mathematical model of motion skew from an image that comprises a frame in a video, the representation of the skewed object image providing an approximate shape and location within the image of the skewed object image;
  remove the skewed object image from view in the image using the computed representation of the skewed object image;
  replace pixels in an area of the image where the skewed object image has been removed from view with pixels gathered from a corresponding area of a different frame in the video; and
  render a corrected object image in the image using the representation of the skewed object image.

23. The apparatus of claim 22, further comprising:
  a rolling shutter image sensor for capturing the image; and
  a display for displaying the captured image.

24. The apparatus of claim 22, wherein the memory and stored computer program code are configured, with the processor, to cause the apparatus to geometrically translate pixels that comprise the skewed object image based on the computed representation of the skewed object image.

25. The apparatus of claim 23, wherein the mathematical model comprises:
a mathematical function of the representation of the skewed object image as a function of a velocity of the object during exposure of the object and a rolling shutter action of a rolling shutter image sensor.

26. The apparatus of claim 25, wherein the memory and stored computer program code are configured, with the processor, to cause the apparatus to calculate at least an approximation of a velocity of the object by comparing the frame with a different frame in the video.

27. A method comprising:
generating a mathematical model of distortion in a distorted object image, wherein generating a mathematical model comprises generating a mathematical function of a representation of the distorted object image as a function of angular velocity of an object while rotating about a point during exposure of the object and a rate of rolling shutter action of a rolling shutter image sensor, wherein the mathematical function of the distorted object image comprises:
$x_{image} = y \tan(\alpha(y_{max}-y)/y_{max} + \beta y/y_{max})$, where x- and y-coordinates are based on x- and y-axes, where the y-axis is perpendicular to rows of pixels sequentially exposed by the rolling shutter image sensor, where the x-axis is perpendicular to the y-axis, where the coordinates are standardized so that a Euclidean distance between a first end and a second end of the object has a value of 1, where an origin of the axes is located at the first end of the object which comprises the point about which the object rotates, where $x_{image}$ is the x-coordinate of the representation of the distorted object image, where $y_{max}$ is the y-coordinate of the second end of the object when the object is at angle $\beta$, where an angle $\alpha$ is determined by the function $\alpha = \beta - (\theta_{club} \, t_{shutter} \, height_{club\beta})$, where $\theta_{club}$ is the angular velocity of the object during exposure of the object, where $t_{shutter}$ is a time taken by the rolling shutter image sensor to expose each row of pixels before exposing a next row of pixels, and where $height_{club\beta}$ is a height of the distorted object image in pixels in the y-direction when the object is at angle $\beta$;
removing the distorted object image from a frame of a video by generating, with a processor, a mask for removing from view the distorted object image; and
rendering a corrected object image in the frame based on the mathematical model of the distortion.

28. The method of claim 27, wherein the rendering of a corrected object comprises:
geometrically translating pixels that comprise the distorted object image based on the mathematical model of the distortion in the distorted object image.

* * * * *

UNITED STATES PATENT AND TRADEMARK OFFICE
CERTIFICATE OF CORRECTION

PATENT NO. : 7,936,945 B2
APPLICATION NO. : 11/612347
DATED : May 3, 2011
INVENTOR(S) : Soinio et al.

It is certified that error appears in the above-identified patent and that said Letters Patent is hereby corrected as shown below:

Column 17
Line 30 "$\alpha = \beta = (\theta_{club} \, t_{shutter}$" should read --$\alpha = \beta - (\theta_{club} \, t_{shutter}$--.

Signed and Sealed this
Second Day of October, 2012

David J. Kappos
*Director of the United States Patent and Trademark Office*